United States Patent [19]

Kirkhuff

[11] 4,387,071

[45] Jun. 7, 1983

[54] NON-PNEUMATIC TIRE AND METHOD OF MAKING THE SAME

[75] Inventor: William J. Kirkhuff, Santa Ana, Calif.

[73] Assignee: Engineering Products of America, Santa Ana, Calif.

[21] Appl. No.: 314,711

[22] Filed: Oct. 26, 1981

[51] Int. Cl.³ .......................... B29D 3/02; B29H 3/08
[52] U.S. Cl. .................................... 264/279.1; 425/577;
 264/328.3; 264/36
[58] Field of Search ....................... 264/279, 279.1, 328,
 264/311, 36, 328; 425/244, 577

[56] References Cited

U.S. PATENT DOCUMENTS 3,458,373 7/1969 Knipp et al. ................... 264/279.1 X
3,975,490 8/1976 Lapeyre ......................... 264/279.1 X
4,166,832 9/1979 Galligia ............................. 264/279

Primary Examiner—J. Howard Flint, Jr.
Attorney, Agent, or Firm—Gordon L. Peterson

[57] ABSTRACT

A non-pneumatic tire for a wheel comprising a hollow inner tube, an outer casing completely encasing the inner tube, and an elongated flexible element tightly tied within the inner tube. The tire can be made by forming an opening in the wall of the inner tube, inserting an elongated flexible element through the passage of the inner tube, deforming the inner tube and tying the end portions of the elongated flexible element together through the opening with the tube in its deformed configuration. The opening is then sealed and the outer casing is molded around the inner tube.

16 Claims, 9 Drawing Figures

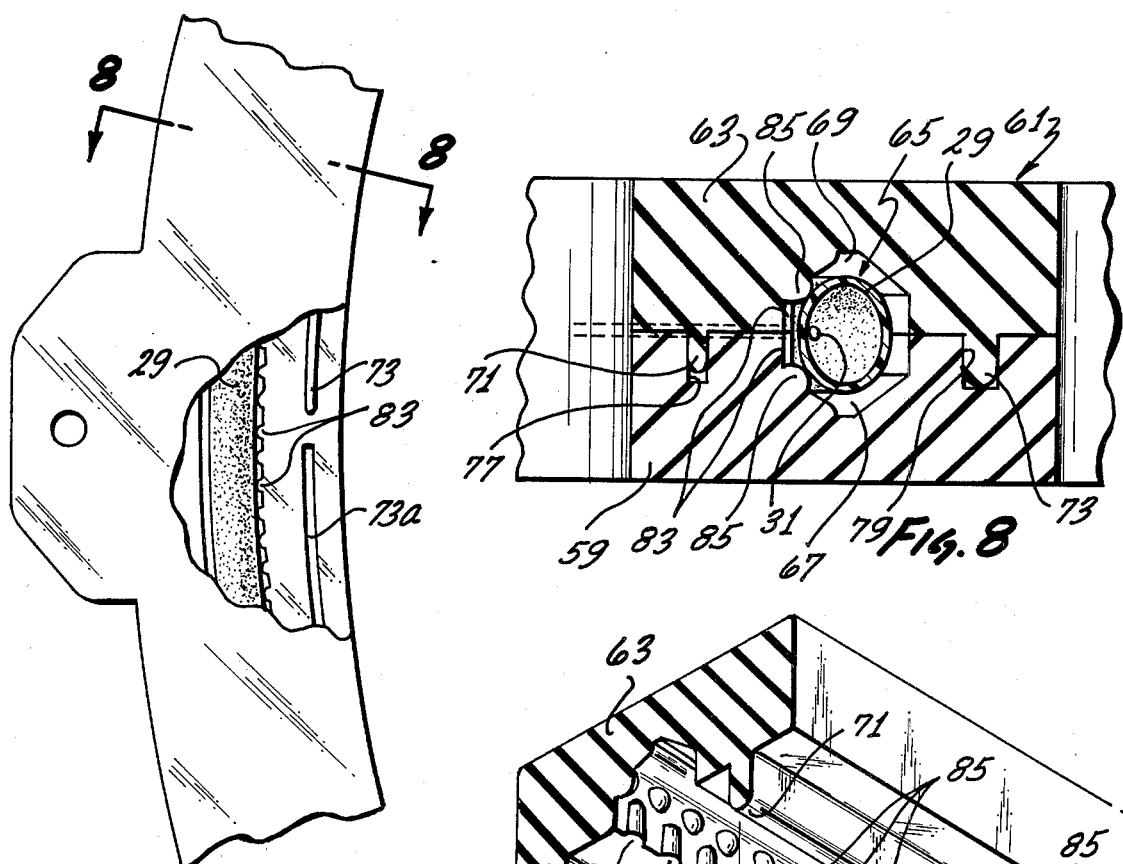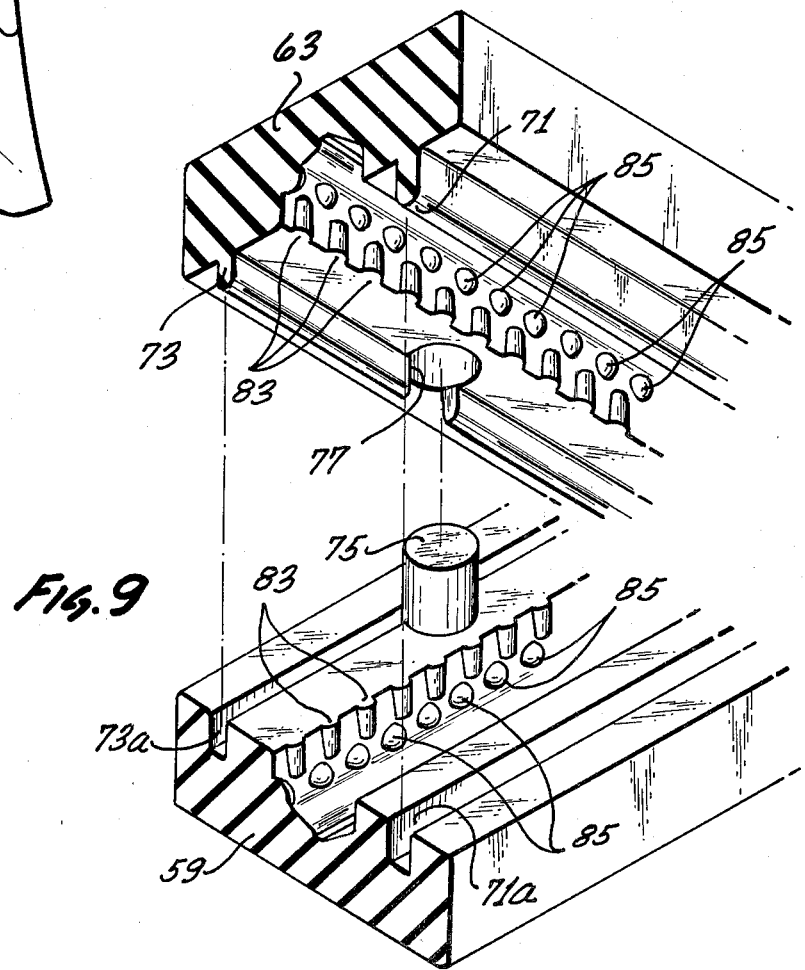

NON-PNEUMATIC TIRE AND METHOD OF MAKING THE SAME

BACKGROUND OF THE INVENTION

Non-pneumatic tires have been used for many years on various kinds of vehicles and they have the advantage of not getting flat or blowing out. For example, non-pneumatic tires are commonly used on wheelchairs, toy vehicles, such as tricycles and wagons, and various work vehicles, such as hand trucks, etc.

One problem with non-pneumatic tires is that the tire tends to demount from the rim by rolling off of the rim. Tire roll-off is particularly troublesome for tires of larger diameter, such as the type commonly used on wheelchairs. Roll-off may occur, for example, as a result of the tire being subjected to torsional forces or other forces acting axially of the wheel axis as a result of turning, skidding or lateral forces exerted on the wheelchair. Also, as the tire ages and/or is subjected to various undesirable environmental factors, the tire may tend to lose its "grip" on the wheel.

One form of prior art tire includes an inner tube partially encased by an outer casing which is provided over the inner tube. In an attempt to solve the roll-off problem, one or more elongated flexible elements are molded into the casing. The elongated flexible elements are molded into the casing adjacent the inner periphery of the casing and at the opposite axial ends of the casing.

The flexible elements tend to increase the hoop strength of the tire and to make the tire more difficult to deform radially outwardly. In mounting a non-pneumatic tire on a wheel, it is necessary to forcibly expand the tire to increase its inner diameter, and this may break the flexible elements. Also, the flexible elements may break during use of the wheelchair or other vehicle on which the tire is mounted as a result of forces applied to the tire during operation of the vehicle. This is particularly true when the wheelchair is used for wheelchair athletic events. Because the flexible elements are completely concealed by the tire, this breakage may go completely unnoticed. However, with one or more of the flexible elements broken, roll-off is much more likely to occur.

SUMMARY OF THE INVENTION

This invention provides a non-pneumatic tire which is easy to mount and has much greater resistance to roll-off than was heretofore attainable. In addition, the flexible element breakage problem of the prior art is also materially reduced.

This invention provides a tire for a wheel that comprises a hollow inner tube formed into a generally ring-like configuration and an outer casing substantially completely encasing the inner tube. Elongated flexible means, such as one or more elongated flexible elements, extends through the passage of the hollow inner tube and is formed into a loop. The flexible element is not gripped by the inner tube, and this is preferably accomplished by making the cross-sectional area of the passage greater than the cross-sectional area of the elongated flexible element.

In the above-described prior art construction, the casing is molded around the elongated flexible elements. Consequently, the casing tightly grips the flexible elements along the full length of each of the flexible elements. This embedding of the flexible elements in the casing and consequent tight gripping of the flexible elements along their full lengths can result in breakage of the flexible elements. For example, in mounting the tire on a rim, a tire iron is used in the conventional manner to elongate the inner circumference of the tire to force it onto the rim. In mounting of the tire, it is necessary to elongate the tire a predetermined amount. Because the flexible element is tightly gripped by the casing, substantially all of this elongation must be accommodated by the resilience of a relatively short length of the flexible element. This produces a high elongation per unit length of the flexible element and, consequently, high stresses which may break the flexible element. However, by providing the flexible element in a relatively larger cross-sectional area passage, the flexible element is not gripped over its entire length and preferably is not gripped at all by the tube or casing. Accordingly, the predetermined amount of elongation of the tire required for mounting of the tire on the rim can be spread over the full length of the flexible element. As a result, the elongation per unit length of the flexible element, the stress in the flexible element and the likelihood of breakage are all reduced.

The flexible element is preferably centrally located in the casing in a direction axially of the ring-like configuration of the casing. Centrally locating the flexible element in this manner is believed to make the flexible element more effective in preventing roll-off than if it were located axially outwardly of such position.

The casing preferably substantially completely encases the inner tube. This construction has sufficient strength, particularly if a strong material is used for the tube so that in some cases, the flexible elements can be eliminated. To adapt the tire for use with a wheel having spokes, a rim and fasteners for coupling the spokes to the rim, the inner periphery of the casing has cavities for receiving the portions of the fasteners which project radially outwardly of the rim.

One apparent problem with the construction of the non-pneumatic tire as described above is how to get the elongated flexible element inside the inner tube. This can be accomplished by providing the tube in a generally hoop-like configuration, forming an opening in the wall of the tube which leads to the passage in the tube and inserting the flexible element through the opening and through the passage. The opposite end portions of the flexible element can be attached together through the opening in the tube wall. For example, the end portions of the flexible element can be brought through the opening and tied together to form a knot.

The flexible element should be taut and tightly circumferentially grip the tube. This can be advantageously accomplished by deforming the hoop-like configuration of the tube radially inwardly and attaching the end portions of the flexible element with the tube in the deformed hoop-like configuration.

The outer casing is preferably molded over the tube. However, because the casing shrinks after it is removed from the mold, the mold cavity must have an inner periphery which is longer circumferentially than the inner periphery of the tube. Accordingly, the tube must be forced into the mold cavity. To cause the casing to substantially completely encase the inner tube, the mold spaces regions of the inner periphery of the tube from the inner periphery of the mold cavity. A suitable flowable material is then injected into the mold cavity to form the casing.

The invention, together with additional features and advantages thereof, may best be understood by reference to the following description taken in connection with the accompanying illustrative drawing.

BRIEF DESCRIPTION OF THE DRAWINGS

FIG. 7 is a fragmentary plan view of a portion of the mold with a portion of the upper mold section being broken away.

FIG. 8 is a sectional view taken generally along line 8—8 of FIG. 7.

FIG. 9 is a perspective view partially in section of the two mold sections of the mold, with the upper mold section being rotated upwardly to better illustrate the configuration of the mold cavity.

DESCRIPTION OF THE PREFERRED EMBODIMENT

Figure 1:
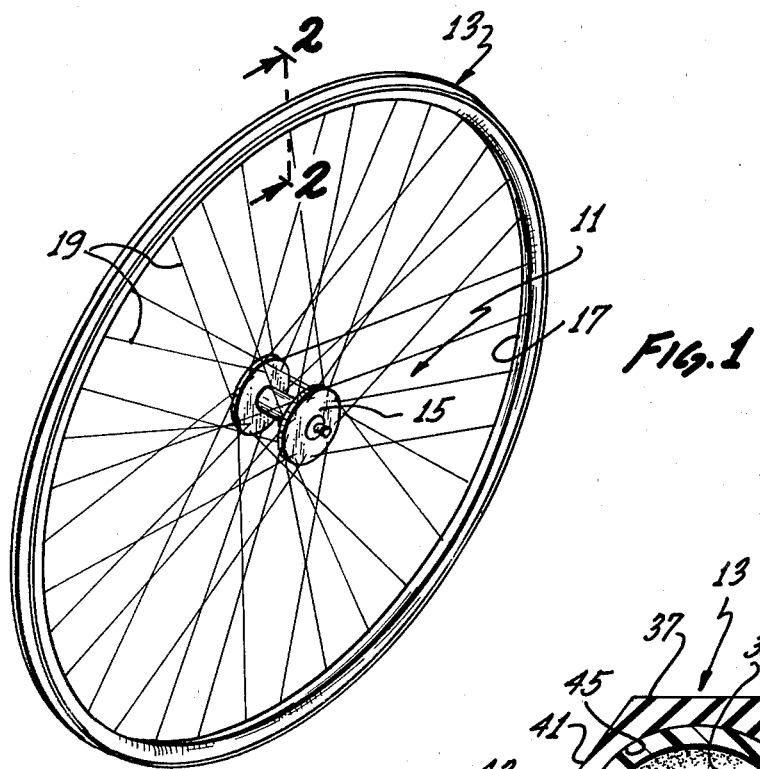
FIG. 1 is a perspective view of a wheel having a tire constructed in accordance with the teachings of this invention and mounted on it.

FIG. 1 shows a wheel 11 having a tire 13 installed on it. Although the wheel 11 may be of different constructions, in the embodiment illustrated, it is of the type used on wheelchairs. In the embodiment illustrated, the wheel 11 includes a central hub 15 adapted to be mounted on a wheelchair (not shown) in a conventional manner, a rim 17 co-axial with the hub, and a plurality of spokes 19 attached to the hub and projecting radially outwardly to the rim to which they are attached in a conventional manner by fasteners 21 (FIG. 2).

Figure 2:
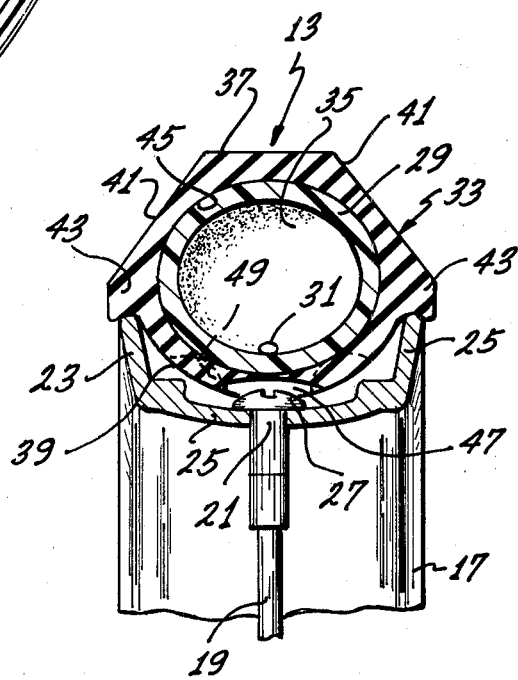
FIG. 2 is an enlarged fragmentary sectional view taken generally along line 2—2 of FIG. 1.
Figure 3:
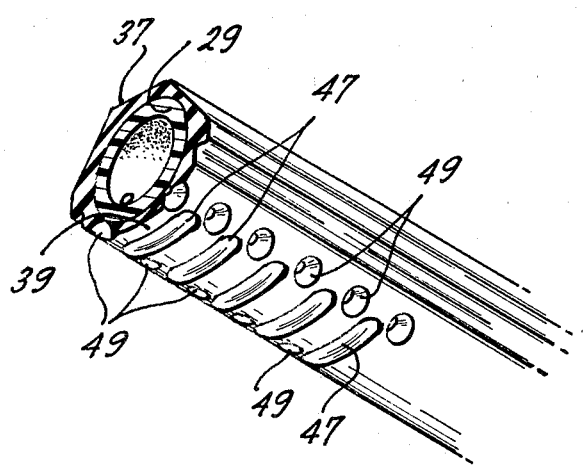
FIG. 3 is a fragmentary perspective view partially in section of a length of the tire.

As shown in FIG. 2, the rim 17 is of generally channel-shaped configuration in axial cross section and it includes generally radially extending legs 23 integrally joined by a generally axially extending web 25. The legs 23 diverge slightly as they project radially outwardly of the web 25. The fasteners 21 attach the spokes 19 to the web 25, and each of the fasteners has a head 27 which rides in the channel radially outwardly of the web 25.

The tire 13 comprises an inner tube 29, an elongated flexible element 31 and a casing 33. The inner tube 29 is preferably constructed of a suitable plastic material, such as low density polyethylene, polypropylene, or a urethane elastomer. The inner tube 29 has a passage 35 that extends circumferentially completely through the inner tube. Although the inner tube 29 can be of various different configurations in axial cross section, in the embodiment illustrated, it is circular and the cross-sectional configuration of the passage 35 is also circular. The inner tube 29 is formed into a ring and, in the embodiment illustrated, is of generally toroidal configuration.

The flexible element 31 may be a cable or string of substantial tensile strength. Although the flexible element 31 can be elongated, it is preferably not elastic in the sense of being easily or substantially stretchable. For example, the flexible element 31 may be constructed of polyester cabled fibers or nylon.

The flexible element 31 extends completely through the passage 35 and, therefore, completely encircles the inner periphery of the tube 29. The flexible element 31 tightly grips an inner annular region of the tube 29 and is, therefore, preloaded and taut; however, the flexible element has a smaller cross-sectional area than the passage 35 and can distribute forces tending to elongate it over the full length of the flexible element to minimize elongation per unit area. Preferably, as viewed in axial cross section, the flexible element 31 is centrally located in the tube 29 and the casing 33, and in the configuration shown in FIG. 2, the flexible element is at the six o'clock position with respect to the circular configuration of the passage 35. As described more fully hereinbelow, the flexible element 31 may have opposite ends which are tied together to form a knot.

The casing 33 is preferably molded around the inner tube 29 and encases the inner tube, including the inner periphery of the tube. Thus, the casing 33 cannot be removed from the tube 29 without cutting or otherwise disrupting the material of the outer casing. As viewed in axial cross section (FIG. 2), the casing 33 and the tube are essentially co-axial.

The casing 33 has an outer peripheral surface 37, an inner peripheral surface 39, sloping side surfaces 41, and annular shoulders 43. Although the surfaces can be of different configurations, preferably, the outer peripheral surface is cylindrical and, therefore, is flat in axial cross section and the inner peripheral surface is convexly curved as viewed in axial cross section. The casing 33 is tubular and has a passage 45 which receives the tube 29.

The inner peripheral surface 39 has a series of circumferentially spaced cavities 47 and two circumferentially extending rows of apertures 49 which extend completely through the wall of the casing 33. The cavities 47 may or may not extend completely through the wall of the casing 33 and the cavities lie between adjacent apertures 49. Except for the apertures 49, and in some cases the cavities 47, the casing 33 completely encases the inner tube 29. Because the apertures 49 and the cavities 47 are circumferentially spaced along the inner peripheral surface 39, the casing 33 may be considered as comprising a series of imperforate ring-like segments circumferentially spaced by ring-like segments which contain the apertures 49.

In use, the tire 13 can be easily mounted on the rim 17 (FIG. 2). In this position, the tire 13 may be subjected to hoop stresses so that the shoulders 43 bear tightly against the outer end of the legs 23. The inner peripheral surface 39 lies closely adjacent the confronting surfaces of the rim 17, and the cavities 47 receive the heads 27 of the fasteners 21, respectively.

The outer peripheral surface 37 lies substantially radially outwardly of the rim 17 and is adapted to engage a supporting surface along which the wheel 11 is to roll. The inner tube 29 is relatively rigid and strong and supports the casing 33. The passage 35 reduces the weight and cost of the tube 29, provides a space for the flexible element 31 and allows the tube to resiliently flex radially to provide a cushioning effect for the wheel 11 and the vehicle with which it is used. The casing 33 is somewhat resilient and also provides some cushioning. The flexible element 31 increases the hoop strength of the tube-casing combination and minimizes the likelihood of roll off. In addition, the flexible element 31 is preferably located centrally of the tire 13 as viewed on an axial plane (FIG. 2) so that the flexible element 31 can be more effective in retaining the tire on the rim 17 and in preventing roll off.

Figure 4:
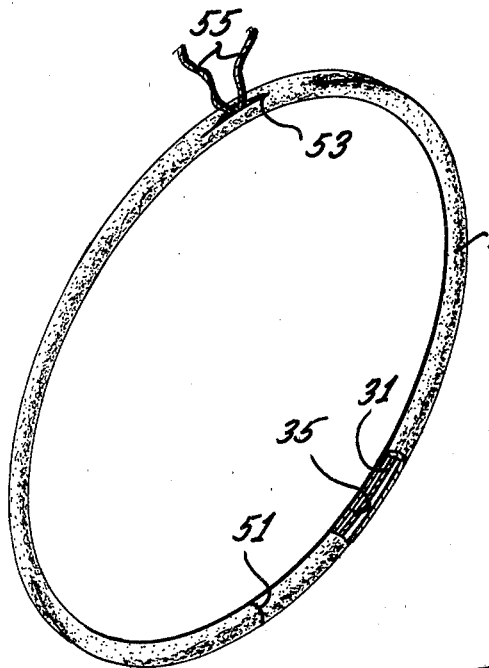
FIG. 4 is a perspective view of the inner tube and elongated flexible element.

FIGS. 4-9 illustrate a preferred method of making the tire 13 and one form of mold that may be used for this purpose. According to the preferred method, the tube 29 is extruded from a suitable plastic material, cut to an appropriate length, formed into a hoop or ring and the end portions are secured together with an appropriate adhesive or heat sealing to form a seam 51 (FIG. 4). An opening in the form of a slit 53 is then formed in the wall of the tube 29 and preferably along the outer periphery of the tube 29. Of course, the slit 53 can be cut in the tube 29 before the tube 29 is formed into the ring-like configuration of FIG. 4, if desired.

Next, the flexible element 31 is inserted through the slit 53 and run through the entire length of the passage 35 so that end portions 55 of the flexible element 31 project out through the slit. The flexible element 31 can be strung through the passage 35 before the tube 25 is formed into a ring.

Figure 5:
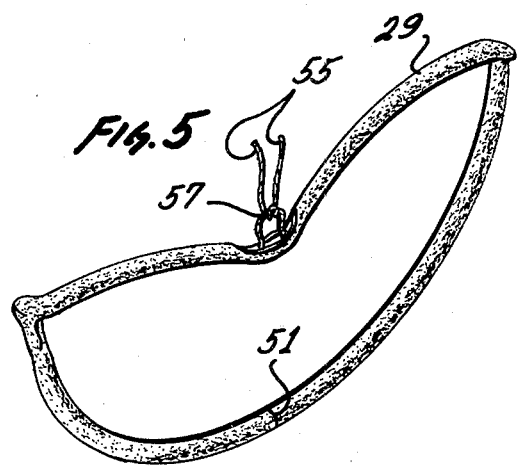
FIG. 5 is a perspective view similar to FIG. 4 with the inner tube being deformed radially inwardly and with the end portions of the flexible element being tied into a knot.

Next, the tube 29 is deformed, such as in the manner shown in FIG. 5, to lengthen the degree to which the end portions 55 can project out of the slit 53. With the tube 29 in the deformed configuration of FIG. 5, the end portions 55 are secured together, such as by tying a knot 57. The knot 57 is tied at a preselected location so that the flexible element 31 will have a known circumferential length as it extends through the passage 35. The length of the flexible element 31 is less than the length of the tube 29 when they are both laid out flat, and accordingly, the flexible element 31 snuggly engages an inner annular region of the tube 29 as shown in FIG. 2 and is preloaded and held taut when the inner tube 29 is allowed to return to its ring-like configuration of FIG. 4. By way of example, and not by way of limitation, the flexible element may be 66 inches long and the tube 29 may be 68 inches long when they are both laid out flat.

As shown in FIG. 5, the tube 29 may be deformed by pushing the region of the tube containing the slit 53 radially inwardly. The tube 29 is sufficiently resilient to permit it to be deformed in this manner. However, when the deforming force is removed, the tube 29 returns to the undeformed ring-like configuration of FIG. 4.

Figure 6:
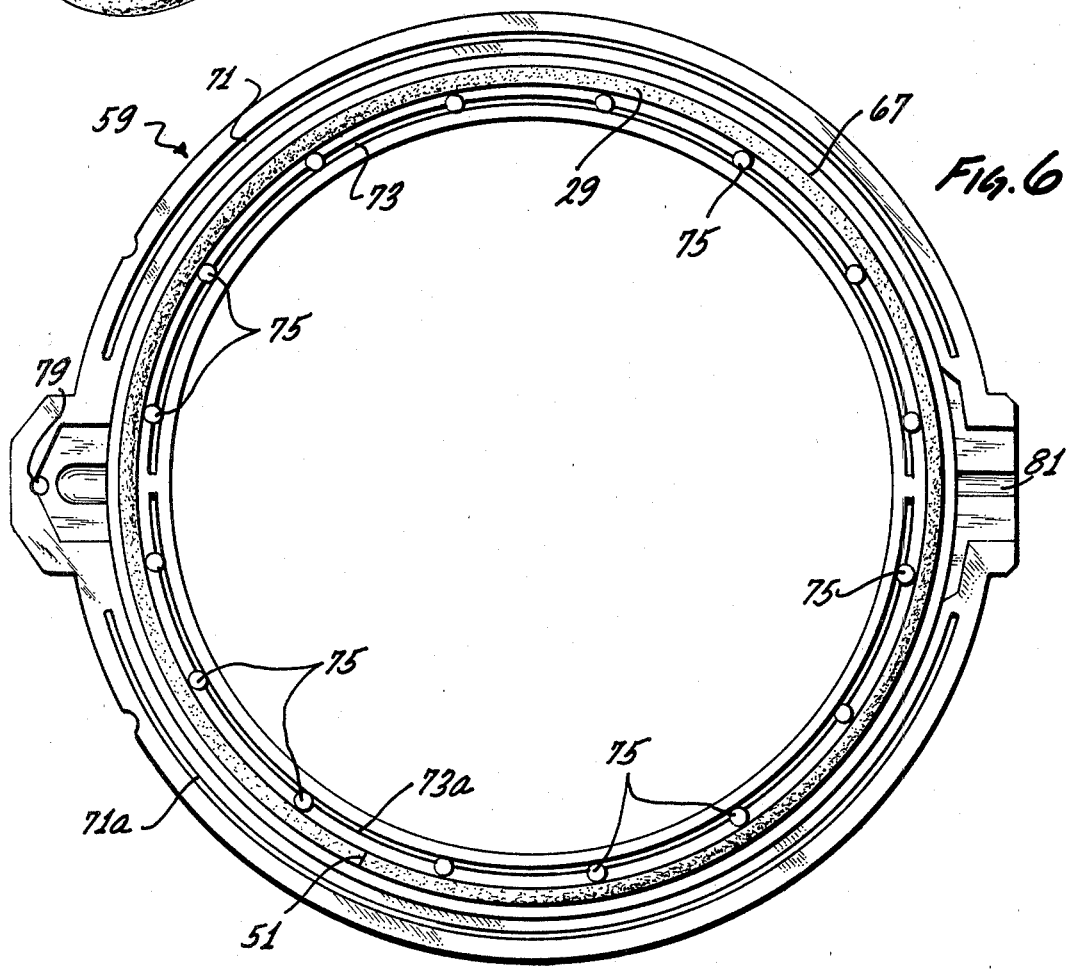
FIG. 6 is a plan view of one mold section and the inner tube.

Next, the tube 29 with the flexible element 31 therein is placed with a lower mold section 59 of a mold 61 as shown in FIG. 6. The mold 61 also includes an upper mold section 63 (FIGS. 8 and 9) which cooperates with the lower mold section 59 to define an annular mold cavity 65 (FIG. 8) which has the external configuration necessary to produce the casing 33. For example, the mold sections may be constructed of a urethane elastomer as shown in FIG. 8, the mold sections 59 and 63 have matching annular recesses 67 and 69, respectively, which cooperate to define the mold cavity 65. Each of the mold sections 59 and 63 is in the form of an annulus and has annular ribs 71 and 73 and complementary grooves 71a and 73a for receiving the ribs 71 and 73. The lower mold section has a plurality of axially extending positioning pins 75 equally spaced circumferentially and arranged in a ring slightly radially invwardly of the mold cavity 65, and the upper mold section 63 has an equal number of mating holes 77. Each of the mold sections 59 and 63 has an inlet 79 communicating with the mold cavity 65 and a vent groove 81 communicating with the mold cavity 65. Each of the mold sections 59 and 63 has aligned ribs 83 and adjacent dimples 85 exposed within the mold cavity 65.

The tube 29 is placed on the lower mold section 59 as shown in FIG. 6. The ring or circle defined by the pattern of pins 75 has a diameter which is just slightly less than the diameter of the tube 29, and accordingly, the pins 75 position the tube with the tube being partially within the recess 67. Because the recess 67 has an inner periphery which is longer circumferentially than the inner periphery of the tube 29, the tube does not fit completely into the recess 67.

Next, the upper mold section 63 is placed over the lower mold section 59 as shown in FIG. 8, with the ribs 71 and 73 being received in the mating grooves 71a and 73a, respectively, and the pins 75 being received in the mating holes of the upper mold section. Forcing of the mold sections 59 and 63 into the position of FIG. 8 causes the dimples 85 to tightly bear against the inner periphery of the tube 29 and to forcibly elongate the tube circumferentially and force it into the mold cavity 65. With the inner tube 29 supported in the mold cavity 65, as shown in FIG. 8, the inner periphery of the inner tube bears tightly against the dimples 85, and the tube is spaced from the ribs 83 in the embodiment illustrated.

Next, plastic material, such as urethane elastomer, which is to form the casing 33, is injected into the mold cavity 65 through the inlet 79 so that it entirely fills the mold cavity and substantially completely encases the inner tube 29, with air in the mold cavity 65 escaping through the vent grooves 81. Specifically, only the region of contact between the dimples 85 and the inner tube 29 prevent complete encasement of the inner tube by the injected flowable plastic material. After the plastic of the casing hardens sufficiently in the mold cavity 65, the mold sections 59 and 63 are separated, the tire is removed from the mold cavity and the casing 33 is allowed to finish curing. As the plastic material of the casing 33 cures, it shrinks, thereby allowing the inner tube 29 to gradually return to substantially the configuration it had before being forced into the mold cavity 65.

Although an exemplary embodiment of the invention has been shown and described, many changes, modifications and substitutions may be made by one having ordinary skill in the art without necessarily departing from the spirit and scope of this invention.

What is claimed is:

1. A method of making a non-pneumatic tire comprising:
    providing a tube in a generally hoop-like configuration and having a circumferentially extending passage, an opening in the wall of the tube leading to the passage, and an elongated flexible element extending through said passage and having end portions;
    attaching the end portions of the elongated flexible element together, utilizing said opening in the tube wall with said flexible element tightly circumferentially gripping the tube; and
    molding a casing over the tube.

2. A method as defined in claim 1 wherein said step of attaching includes bringing the end portions of the elongated flexible element through the opening and tying the end portions together.

3. A method as defined in claim 1 or 2 including deforming the hoop-like configuration and carrying out said step of attaching with the tube deformed whereby the elongated flexible element is caused to tightly circumferentially grip the tube when the tube is returned from the deformed hoop-like configuration.

4. A method as defined in claim 1 including sealing said opening in the tube prior to said step of molding.

5. A method as defined in claim 1 wherein said step of molding includes providing a mold cavity of ring-like configuration having an inner periphery which is longer circumferentially than the inner periphery of the tube, forcing the tube into said mold cavity, spacing regions of the inner periphery of the tube from the inner periphery of the mold cavity, injecting a flowable material into the mold cavity to form the casing, and removing the tube and casing as a unit from the mold cavity.

6. A method as defined in claim 5 including sealing said opening in the tube prior to said step of molding, said step of attaching includes deforming the hoop-like configuration of the tube and tying the end portions of the flexible element together in a knot with the tube in the deformed hoop-like configuration.

7. A method as defined in claim 1 wherein said step of providing includes providing said tube with said passage extending axially through the tube and with said tube having end portions and joining said end portions to form the tube into said hoop-like configuration.

8. A method as defined in claim 1 wherein said step of providing includes inserting the elongated flexible element through the opening in the wall of the tube and into the passage of the tube.

9. A method as defined in claim 1 wherein said step of molding includes providing a mold comprising first and second mold sections with each of the mold sections having a recess which cooperates to define a mold cavity, said mold cavity being of ring-like configuration and having an inner periphery which is longer circumferentially than the inner periphery of the tube, positioning the tube on said first mold section with the tube being partially in the recess of the first mold cavity, and forcing said mold sections together to form the mold cavity and to force the tube into the mold cavity, injecting flowable material into the mold cavity to form the casing, and removing the tube and casing as a unit from the mold cavity.

10. A method as defined in claim 9 wherein one of said mold sections includes a plurality of projections arranged in a ring-like pattern adjacent the inner periphery of the recess of said first mold section and said step of positioning includes placing the tube over the projections.

11. A method of making a tire comprising:
providing a tube in a generally hoop-like configuration and having an inner periphery;
providing a mold cavity of ring-like configuration having an inner periphery which is longer circumferentially than the inner periphery of the tube;
forcing the tube into said mold cavity;
spacing regions of the inner periphery of the tube from the inner periphery of the mold cavity;
injecting a flowable material into the mold cavity to form a casing around the tube; and
removing the tube and casing as a unit from the mold cavity.

12. A method as defined in claim 11 wherein the mold cavity has a plurality of projections on its inner periphery and said step of forcing forces the tube over said projections whereby regions of the inner periphery of the tube are spaced from the inner periphery of the mold cavity.

13. A method as defined in claim 11 wherein said step of providing a mold cavity includes providing a mold comprising first and second mold sections with each of the mold sections having a recess which cooperates to define the mold cavity, said step of forcing includes positioning the tube on said first mold section and forcing the mold sections together to form the mold cavity and to force the tube into the mold cavity.

14. A method as defined in claim 13 wherein at least said first mold section has a plurality of projections which project from the inner periphery of the mold cavity and said step of forcing the mold sections together forces the tube over said projections whereby regions of the inner periphery of the tube are spaced from the inner periphery of the mold cavity.

15. A method as defined in claim 13 wherein each of said mold sections includes a plurality of projections projecting from the inner periphery of the mold cavity and said step of forcing forces the tube over the projections whereby regions of the inner periphery of the tube are spaced from the inner periphery of the mold cavity.

16. A mold as defined in claim 1 wherein said mold sections have confronting faces and including projecting means on the confronting face of said first mold section for supporting a tube adjacent the ring-like recess thereof, said projecting means lying radially inwardly of said last-mentioned ring-like recess.

* * * * *